Sept. 1, 1931.     L. T. TROLAND     1,821,680
MULTIPLEX FILM AND PROCESS OF MAKING
Filed June 15, 1929
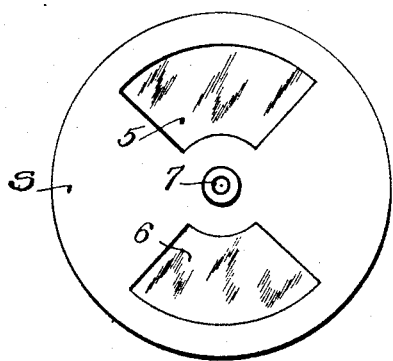
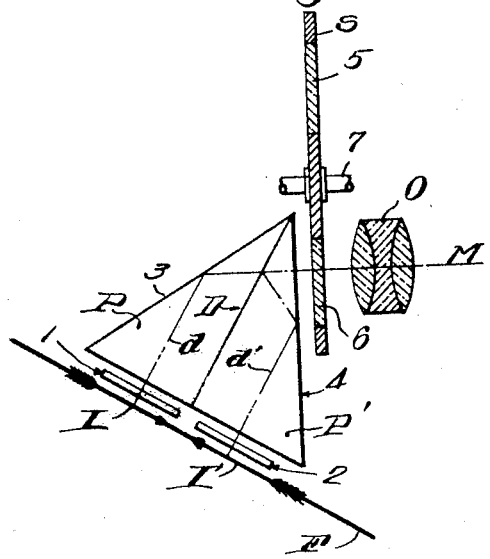
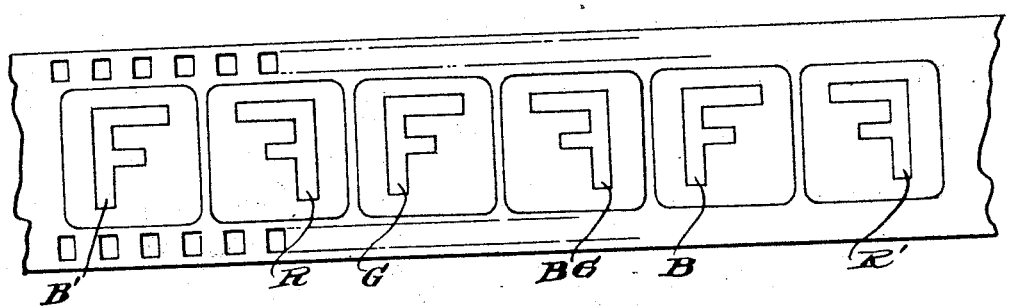

Patented Sept. 1, 1931

1,821,680

UNITED STATES PATENT OFFICE

LEONARD T. TROLAND, OF CAMBRIDGE, MASSACHUSETTS, ASSIGNOR TO TECHNICOLOR MOTION PICTURE CORPORATION, OF BOSTON, MASSACHUSETTS, A CORPORATION OF MAINE

MULTIPLEX FILM AND PROCESS OF MAKING

Application filed June 15, 1929. Serial No. 371,151.

Objects of the present invention are to provide cinematographic film representing three or more color aspects of the object-field in which the respective images of each complemental set are substantially alike so that they may be accurately registered with respect to each other without noticeable color fringes and to provide a method which minimizes the registration difficulties due to shrinkage and expansion of the film, which affords a short distance between objective and film and which permits the use of film in one or more strips for the several series of images.

For the purpose of illustrating the genus of the invention a typical embodiment is shown in the accompanying drawings, in which:

Fig. 1 is a diagrammatic view of an optical system;

Fig. 2 is a side view of the shutter shown in cross section in Fig. 1; and

Fig. 3 is a plan view of a section of film exposed with the optical system shown in Fig. 1.

The particular optical system chosen for the purpose of illustration comprises a prism unit consisting of two prisms P and P' with a light-dividing surface D therebetween, a shutter S and a suitable objective lens O for focusing images upon the film F. The light-dividing surface D may be formed in any suitable way as by a light coating of silver adapted to divide the main beam of light along the axis M in two similar beams light along the axes $d$ and $d'$. While the light may be unequally divided at the surface D, for most purposes it is preferable to make the divisions substantially equal.

Color filters 1 and 2 are mounted in the paths of the divided beams so that the images I and I' formed by the divided beams of light represent different color aspects of the object-field; and owing to the fact that the light forming image I is reflected only once at the total-reflecting surface 3 whereas the light forming image I' is reflected twice, once at the partial reflecting surface D and once at the total reflecting surface 4, the images I and I' are reversed with respect to each other, as indicated by the arrows. While these images may be focused upon separate films traveling along parallel paths (perpendicularly to the paper in Fig. 1), it is advantageous to focus them on the same film traveling along a path successively intersecting the two beams $d$ and $d'$ so that the images are reversed with respect to each other longitudinally of the film on the same side of the film. Thus by registering the images of each pair with respect to registering openings or notches in the film at or near the line midway between the two images, the shrinkage or contraction of the film cancels in subsequent operations so that the images may be printed in exact superposition or otherwise in exact registry with each other.

A characteristic feature of the optical system consists in that the paths of the divided beams are exactly alike, both in air and in glass, so that the two images I and I' are geometrically identical. Another important characteristic consists in that the major portion of the space between the objective lens and the film is filled with a solid mass of glass.

According to this invention the shutter S is provided with two windows 5 and 6 in which are mounted filters for absorbing certain components of the light of the main beam. The shutter is mounted to rotate about the axis 7 in synchronism with the intermittent feed of the film F so that the filters 5 and 6 are in the path of the main beam during the exposure of the film to alternate pairs of pictures respectively. Thus four different color aspects of the object-field may be separately photographed on the film corresponding to the following combinations of color filters—1—5, 2—5, 1—6, and 2—6. Obviously the color aspects recorded on the film will depend upon the characteristics of the filters, which in turn may be variously predetermined in accordance with the judgment of the maker. However, for three-color work suitable colors for the filters 1, 2, 5 and 6 are minus green, green, minus red and minus blue, which will hereafter be referred to as $-G$, $G$, $-R$ and $-B$.

With this combination of filters the picture formed at I through filters 1 and 5 represents the blue aspect of the object-field, the picture formed at I' through filters 2 and 5 represents the green aspect of the object-field, the picture formed at I through filters 1 and 6 represents the red aspect, and the picture formed at I' through filters 2 and 6 also represents the green aspect. For four-color work the filter 2 is preferably minus red instead of green, in which case the image formed at I' through filters 2 and 5 will represent the fourth color aspect blue-green instead of green.

Of the many different filters available the best combination of which I am aware comprises Wratten 43 for minus red, Wratten 32 for the minus green and a Wratten 9 or 12 for the minus blue. In this connection it will be understood that throughout the specification and claims the terms red, green and blue are not intended to connote exact colors but are intended merely to connote colors in which these particular hues are predominant or largely characteristic.

Referring to Fig. 3 the images are represented by the letter F to show that the images of each pair R—G and BG—B) are reversed with respect to each other longitudinally of the film, the images R and G constituting one pair exposed simultaneously through the minus blue filter 6 for example, BG and G another pair exposed simultaneously through the minus red filter 5 for example, etc., the four images R, G, BG and B together constituting one complete set of images, and the images B' and R' representing the first and last images of corresponding adjacent sets of images. If only three-color aspects are desired one image (for example the blue-green image) of each set need not be reproduced and, when using two films traveling at right angles to the path of the film F in Fig. 1, only one series of images may be formed on one of the two films, in which case it is preferably advanced one picture space at a time (instead of two as in the case of the other film) and an auxiliary shutter may be provided between the prism and the film to cut off the light while one of the two filters 5 or 6 is in the path of the main beam (the minus red filter 5 in case the blue-green aspect is not desired).

In the case of rapidly moving objects the pictures formed through the filters 5 and 6 at successive intervals of time will not register precisely, resulting in a tendency toward color fringes; but by taking the red and green records simultaneously they will register exactly and when using only a single additional color such as blue, fringes will not be noticeable for the reason that the blue record, which is colored yellow in the final picture, does not contribute largely to the definition of the picture; and to a lesser degree the same is true of the blue-green record in the four-color example.

For certain purposes only one filter may be used in shutter S, the space for the other filter being left open, in which case three or four different color aspects may be recorded inasmuch as each image is recorded through a different combination, viz., 1. 2, 1 with 5 or 6 and 2 with 5 or 6.

I claim:

1. The art of making cinematographic film bearing complemental images of the object-field which comprises exposing different areas through different filters in series, each of two filters functioning alternately in series with each of two other filters.

2. The art of making cinematographic film bearing three or more images of the object-field along two paths which comprises exposing two of the images through different filter combinations, changing one of the combinations, and subsequently exposing another image along one of the paths.

3. The art of making cinematographic film bearing three or more images of the object-field along two paths which comprises exposing two of the images through different filter combinations, changing the combination for each path, and subsequently exposing two more images along the same path, whereby each image represents a different color aspect of the object-field.

4. The art of making cinematographic film bearing three complemental images of the object-field which comprises dividing a main image-bearing beam into component beams incident to the film along branched paths, simultaneously exposing two images of each set in said paths respectively, alternately exposing a third image of each set along one of said paths, and differently filtering the beams for each of said images, the filter in the path of one beam being changed between successive exposures.

5. The art of making cinematographic film bearing three complemental images of the object-field which comprises focusing a beam in its main path, dividing the beam along branched paths, simultaneously exposing two images of each set in the branched paths respectively, alternately exposing a third image of each set along one of said branched paths, filtering the beams in each of said paths, and changing the filter in one path between successive exposures of the images of each complemental set.

6. The art of making cinematographic film bearing complemental images of the object-field which comprises dividing a beam of light, acting upon the beam of light concomitantly to bring images of the object-field into focus from the same point of view in respective divisions of the beam on cinematographic film, transmitting the respective divisions of the beam to the film through optically like paths, successively exposing new areas of the film in the focal plane of each image to form two series of images comprising recurrent pairs of images exposed simultaneously, alternately exposing the film along one of said paths in the interims between said exposures to form another series of images, and filtering out color components differently for the images of each of said series, thereby to obtain successive sets of images representing at least three different color aspects of the object-field.

7. The art of making cinematographic film bearing complemental images of the object-field which comprises dividing a beam of light, acting upon the beam of light concomitantly to bring images of the object-field into focus from the same point of view in respective divisions of the beam in mutually reversed relationship to each other on cinematographic film, transmitting the respective divisions of the beam to the film through optically like paths, successively exposing new areas of the film in the focal plane of each image recurrently to form pairs of images, and filtering out color components of light differently for the images of each pair and differently for alternate pairs, thereby to obtain successive sets of images representing four different color aspects of the object-field.

8. The method of making cinematographic film bearing series of multiplex images of the same object-field comprising dividing a beam of light, acting upon the beam of light to bring images of the object-field into focus from the same point of view in respective divisions of the beam in mutually reversed relationship to each other and side to side on the same side of the film, simultaneously exposing areas of the film through different filters to form pairs of images representing three color aspects of the object-field and alternately exposing other areas to still a different color aspect.

9. The method of making cinematographic film bearing series of multiplex images of the same object-field comprising dividing a beam of light, acting upon the beam of light to bring images of the object-field into focus from the same point of view in respective divisions of the beam in mutually reversed relationship to each other and side to side on the same side of the film, simultaneously exposing areas of the film to red and green components of said divisions respectively and alternately exposing other areas to the blue component of one of said divisions.

10. The method of making multiplex cinematographic film which comprises causing incidence of a beam of light converging to an image obliquely upon a partly reflecting and partly transmitting plane surface to form similar divided image-forming beams, transmitting the divided beams divergently along like paths symmetrical to each other relatively to the plane of the partially reflecting surface to form images in reversed relation to each other about a line parallel to margins of the images, feeding film transversely of said paths in the image planes of said image-forming beams, simultaneously exposing areas of the film through different filters and alternately exposing other areas through another filter.

11. The method of making multiplex cinematographic film which comprises causing incidence of a beam of light converging to an image obliquely upon a partly reflecting and partly transmitting plane surface to form similar divided image-forming beams, transmitting the divided beams divergently along like paths symmetrical to each other relatively to the plane of the partially reflecting surface to form images in reversed relation to each other about a line parallel to margins of the images, feeding film transversely of said paths in the image planes of said image-forming beams, simultaneously exposing areas of the film to red and green components of said divided beams respectively and alternately exposing other areas to the blue component of one of said divided beams.

12. Cinematographic film having three series of complemental images representing different color aspects respectively, the images of two of the series representing concomitant time aspects of the object-field, and the images of the other series representing time aspects alternating with those of the first two.

13. Cinematographic film having series of complemental records representing red, green and blue color aspects respectively, the red and green records representing simultaneous aspects and the blue records representing alternate aspects.

14. Cinematographic film having series of complemental records representing red, green and blue color aspects respectively, the red and green records representing simultaneous aspects and being reversed with respect to each other, and the blue records representing alternate aspects.

15. Cinematographic film having a plurality of series of complemental images, two images of each complemental set being taken from the same point of view at the same time and a third image of each set being taken from the same point of view at a slightly different time.

16. Cinematographic film having a plurality of series of complemental images, two images of each complemental set being taken from the same point of view at the same time and being reversed with respect to each other, and a third image of each set being taken from the same point of view at a slightly different time.

17. Cinematographic film having a series of complemental records representing red, green and blue color aspects respectively, the red and green records representing simultaneous aspects from the same point of view along equal paths and the blue records representing alternate aspects.

18. The art of making cinematographic film having three complemental series of images which comprises simultaneously exposing corresponding images of the red and green series from the same point of view substantially equidistantly from the objective measured along the path of light to the respective images, and alternately exposing images of the blue series.

19. The method of making three-color cinematographic pictures which comprises recurrently exposing, through a suitable optical system, pairs of records representing two color aspects from the same point of view and approximately equidistant from the plane where light enters the optical system measured along the path of the light to the respective records, and alternately forming a third record representing another color aspect.

20. The method of making three-color cinematographic pictures which comprises recurrently exposing, through a suitable optical system, pairs of records representing two color aspects from the same point of view and approximately equidistant from the plane where light enters the optical system measured along the path of the light to the respective records, and alternately forming a third record representing a blue aspect.

Signed by me at Boston, Massachusetts, this 12th day of June, 1929.

LEONARD T. TROLAND.